United States Patent
Thompson

[11] 3,976,358
[45] Aug. 24, 1976

[54] VARIABLE OPTICAL COUPLER

[75] Inventor: George H. B. Thompson, Harlow, England

[73] Assignee: International Standard Electric Corporation, New York, N.Y.

[22] Filed: July 9, 1975

[21] Appl. No.: 594,480

[30] Foreign Application Priority Data
Aug. 8, 1974    United Kingdom............... 34979/74

[52] U.S. Cl. ......................... 350/96 C; 350/96 WG
[51] Int. Cl.² ........................................... G02B 5/14
[58] Field of Search ..................... 350/96 C, 96 WG

[56] References Cited
UNITED STATES PATENTS
3,760,297    9/1973    Thompson..................... 350/96 WG
3,883,219    5/1975    Logan et al. .................. 350/96 WG Primary Examiner—John K. Corbin
Assistant Examiner—Stewart Levy
Attorney, Agent, or Firm—John T. O'Halloran; Peter C. Van Der Sluys; Vincent Ingrassia

[57] ABSTRACT

This invention relates to an optical waveguide switch and directional coupler providing variable coupling between two optical fibers. The coupler is fabricated in semiconductive material such as GaAs or GaAlAs. A double heterostructure is used having a higher index of refraction middle layer. Optical fibers are inserted in channels in the semiconductive material. Varying the reverse bias across the heterostructure junctions located in the material between the channels electrically changes the refractive index of the material and alters the coupling between the fibers. The device is applicable to switching in optical communication systems.

15 Claims, 4 Drawing Figures

VARIABLE OPTICAL COUPLER

BACKGROUND OF THE INVENTION

This invention relates to variable coupling optical waveguide couplers.

One example of a suitable double heterostructure is that of the GaAlAs — GaAs — GaAlAs structure developed for injection laser manufacture. Typically the refractive index difference between the middle and flanking layers is great enough to provide relatively strong guiding so that the middle layer can be reduced in thickness. This guiding is in a direction normal to the planes of the heterojunctions.

In order to fabricate a waveguide, guiding is also required in a direction lying in the planes of the heterojunctions. This can be achieved by known techniques, such as impurity diffusion and proton bombardment, used to alter locally the electron concentration within the middle layer. The light is constrained to propagate in the region of lower electron concentration, but in this case the refractive index difference that is produced is normally smaller, and hence the width of the waveguide is made larger than its height, and may be typically within the range 2 to 8 $\mu$m.

The coupling between a pair of optical waveguides that are in fixed spatial relationship to one another is accomplished by altering the guiding properties by changing the refractive index. This change may be brought about electrically in a direct manner making use of the electro-optic effect. In semiconductive material having a pn junction there is a second way of changing the refractive index electrically. The application of a reverse bias to a pn junction produces a change of refractive index on the n-type side of the junction in the depletion region as a result of the extraction of electrons from that region. Where this extraction of electrons effect is present, the electro-optic effect will also be present since there is an electric field across the depletion region.

GaAs is a sensitive electro-optic material, the interaction being in fact stronger than in materials such as LiNbO$_3$ which already form the basis of effective optical switches. The p-n junction is a convenient structure across which to apply the electro-optic field. It is then not necessary to produce high resistivity GaAs (for reducing current flow) since the p-n junction does this automatically when reverse biassed. The field appears across the depletion region. The only condition to be met in the semiconductor doping level is that the carrier concentration should be low enough to enable the depletion layer under reverse bias to extend across an appreciable proportion of the middle optical guiding layer of the semiconductor sandwich.

The electro-optic effect in GaAs is such that the application of an electric field across a p-n junction produces in general a change in refractive index for light propagating in the plane of the junction. The precise effect depends on the crystallographic orientation of the junction, the polarization of the light and the direction in which it propagates in the junction plane. With the junction in the (100) plane the maximum change in refractive index occurs for a mode with its electric field polarized in the junction plane and propagating in any of the relevant (110) directions. There is zero change for propagation in the (100) directions and there is zero effect for all relevant directions of propagation of a mode with its electric field polarized perpendicular to the (100) plane. With the junction in the (111) plane the effect is independent of the direction of propagation of the modes in the junction plane but is twice as great for a mode with its electric field polarized in the plane of the junction as for the complementary polarization, and of opposite sign. It will be noticed that for neither of these orientations, or for any other possible orientation, is it possible to obtain the same effect for modes of both polarizations.

The maximum usable change of refractive index, for modes polarized in the plane of the junction, is of the order of 0.0005 for a reverse bias approaching breakdown. The electric field extends in the direction normal to the p-n junction to a distance approximately equal to the thickness of the depletion layer. For this distance to be about equal to the thickness of the light guide (not less than 0.2 $\mu$m) at the highest voltage that can be applied, the doping should be less than about $3 \times 10^{17}$ cm$^{-3}$. The voltage required is then about 15 volts.

In addition to its effect on the electro-optic interaction the field also changes the refractive index of the region close to the p-n junction by removing the free carriers. At the highest doping level suggested above of $3 \times 10^{17}$ cm$^{-3}$ removal of electrons also (by coincidence) perturbs the refractive index by approximately the same value of 0.0005. In this case the refractive index change is isotropic, and the field increases the value of the refractive index. Hence under certain conditions, but not at low doping levels, depletion of carriers by an applied field can be used for switching purposes almost as effectively as the electro-optic effect.

A change in refractive index of 0.0005 is very significant compared with the refractive index variation in the plane of the junction associated with the waveguide structure (and induced by ion beam processing or diffusion of impurities). The refractive index step that is required for single mode propagation in the plane of the junction decreases as the inverse square of the guide width and is typically 0.0005 for a guide width of 4 $\mu$m. Hence the perturbation of refractive index produced by the electro-optic effect or by the carrier depletion effect can be sufficient either to confine light to a guide width of 4 $\mu$m without any existing refractive index variation, or conversely, to destroy an already existing guiding effect of such a magnitude. This can be immediately applied to switching applications since it enables alternative connections to be made or destroyed between any number of open ended input guides and output guides. If the effect is strong enough to be applied to open ended guides in this fashion then it can also be applied to the less demanding situation of modifying the coupling between two guides lying alongside one another to make an alternative and more sensitive form of switch.

Two methods are possible for using the electro-optic interaction or the electron depletion effect to give this variation of coupling. In one method the normal electric field is applied across the region in between the two guides, and in the other it is applied across one of the guides. In the first case the coupling is directly affected by the field and in the second case it is affected indirectly as a result of the consequent interference with the phase coherence between the two guides.

Different forms of construction are used for the two methods. The layout is dictated by the requirement firstly that a p-n junction must be provided at the point where the field is to be applied, and secondly that the guides themselves must be composed of either semi-insulating material or p-type material, while the regions on either side must be n-type material. This second requirement gives the appropriate relative values of the refractive index for optical guiding in a direction lying in the planes of the heterojunctions while optical guiding in the direction normal to the planes of the heterojunctions is provided by the changes of refractive index at the heterojunctions themselves.

It is an object of the present invention to provide an optical waveguide coupler wherein a p-n junction is provided at the point of applied field and wherein the guides themselves are composed of either semi-insulating material or p-type material, while the regions on either side are n-type material.

According to a broad aspect of the invention, there is provided a semiconductive double heterostructure optical waveguide coupler comprising: a first layer of semiconductive material having first and second major surfaces; a second layer of semiconductive material on said first major surface; a third layer of semiconductive material on said second major surface, said first layer having an index of refraction higher than said second and third layers; a plurality of channels of semi-insulating material forming coupled optical waveguides, said channels extending through said first and second layers; and means for applying a reverse bias across said first, second and third layers to produce a depletion region which alters the optical coupling between said waveguides.

There follows a description of variable coupling optical waveguide directional couplers embodying the invention in preferred forms. The description refers to the accompanying drawings, in which:

DESCRIPTION OF THE PREFERRED EMBODIMENT

Figure 1:
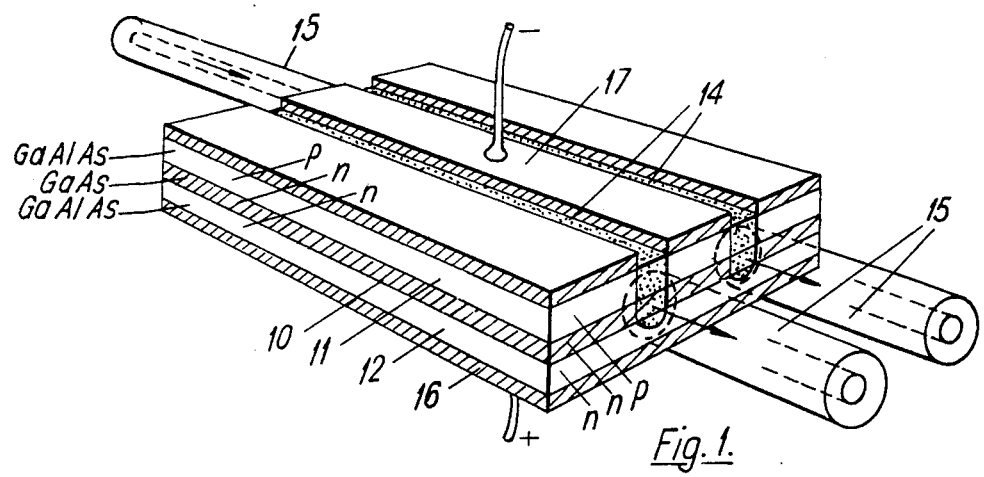
FIG. 1 is a perspective view of a directional coupler.
Figure 2:
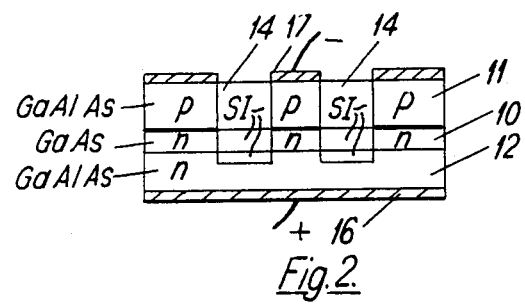
FIG. 2 is a section through the directional coupler of FIG. 1.

The directional coupler of FIGS. 1 and 2 consists of a double heterostructure device having an n-type GaAs layer 10, typically 0.3 $\mu$m thick, flanked on one side by a p-type GaAlAs layer 11, and on the other side by an n-type GaAlAs layer 12. The GaAlAs layers typically have aluminium substituted for about 40% of the gallium. Proton bombardment is used to form in this device two parallel channels 14 of semi-insulating material. These channels go deep enough to extend through the GaAs layer and are typically 4 $\mu$m wide and spaced apart by about 3 $\mu$m. The semi-insulating regions of GaAs formed by the proton bombardment constitute the coupled optical waveguides of the device, and their ends may be butted against the ends of the cores of optical fibre waveguides 15. The n-type layer 12 of GaAlAs is provided with a contact 16, and another contact, 17, is provided on the p-type layer 11 of GaAlAs in the region between the two channels 14. The application of a reverse bias between these two contacts will produce a depletion layer extending at least partially through the thickness of the GaAs layer in the region between the two channels 14. This has the effect of increasing the refractive index of this zone, and hence of increasing the optical coupling between the two waveguides of the coupler.

If the junction lies in the (100) plane and the guides lie in the (100) directions then only the extraction of carriers contributes to the refractive index change and the behavior is independent of polarization of the guided light. For other orientations it can be arranged that the electro-optic effect also contributes to the refractive index change but with a different result for the two polarizations.

Figure 3:
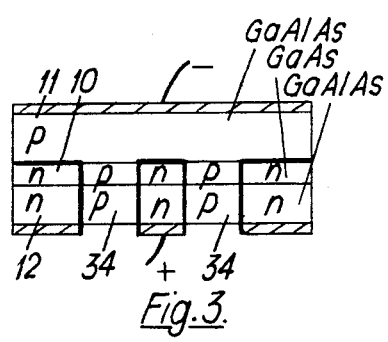
FIG. 3 is a section through a modified version of the directional coupler of FIG. 1.

In a modified version of the above described optical coupler the waveguides of the device are made by a p-type diffusion of zinc instead of by proton bombardment. This modified version, which is depicted in FIG. 3, functions in essentially the same manner as the coupler of FIGS. 1 and 2. In this device the troughs 14 formed by proton bombardment are replaced by troughs 34 formed by the diffusion of zinc under conditions of low arsenic vapor pressure. The waveguides of the coupler are formed by the regions of the GaAs layer through which these troughs extend.

Figure 4:
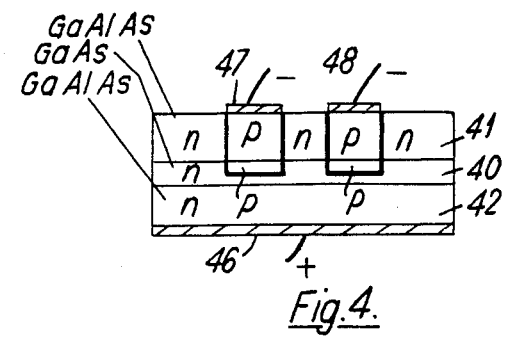
FIG. 4 depicts a section through an alternative form of directional coupler.

P-type diffusion of zinc is also used in the construction of the optical coupler depicted in FIG. 4. This coupler is made from a double heterostructure piece of semiconductor consisting of a layer 40 of n-type GaAs flanked by two layers 41 and 42 both of n-type GaAlAs. Zinc diffusion is used to create a pair of parallel channels of p-type material extending into, but not completely through, the GaAs layer. The n-type layer 42 of GaAlAs is provided with a contact 46, and the two p-type regions of the layer 41 with independent contacts 47 and 48.

The structures of FIGS. 3 and 4 may also be fabricated by the diffusion of an n-type impurity into mainly p-type material, the diffusion in this case being limited to those areas outside the region in which the stripe guides are to be formed. This form of construction is particularly appropriate for the structure in FIG. 4, since the critical position of the p-n junction is then determined by the more easily controllable heterostructure growth and the only requirement on the diffusion (performed from the top surface) is that it should penetrate beyond the junction.

The application of a reverse bias between contact 46 and one of the other contacts, for instance contact 47, produces a depletion region in the n-type region of the GaAs layer 40 underlying the p-type diffusion under contact 47. The resulting change of refractive index affects the guiding properties of only one of the guides with the result that the degree of matching between the propagation velocities in the two guides is affected and hence the degree of optical coupling between them.

The provision of contacts on both p-type regions enables an off-set voltage to be applied to one of them to compensate for any mismatch in the propagation velocities of the two guides resulting from slight physical differences between the two guides. Then the application of a further off-set voltage equally to both of the contacts 47 and 48 may be used to modify the optical properties of both guides so that the physical length of the guides is appropriate for 100% coupling between them. The application of a superimposed signal voltage to just one of the guides may then be used to reduce the coupling effectively to zero.

In each of the above described couplers the middle GaAs layer may be replaced with a GaAlAs layer provided that the aluminium concentration of the flanking GaAlAs layers is increased so as to maintain the refractive index difference across the heterojunctions.

While the foregoing specific description has related exclusively to couplers with optical coupling between a single pair of waveguides, it is to be understood that the invention is applicable also to couplers with a larger number of optical waveguides. In particular the preferred embodiments may readily be modified to provide constructions with three waveguides in which the optical coupling between the middle guide and each of the other two guides may be separately controlled.

While the principles of the invention have been described above in connection with specific apparatus, it is to be clearly understood that this description is made only by way of example and not as a limitation on the scope of the invention.

What is claimed is:

1. A semiconductive double heterostructure optical waveguide coupler comprising:
   a first layer of semiconductive material having first and second major surfaces;
   a second layer of semiconductive material on said first major surface;
   a third layer of semiconductive material on said second major surface, said first layer having an index of refraction higher than said second and third layers;
   a plurality of channels of semi-insulating material forming coupled optical waveguides, said channels extending through said first and second layers; and
   means for applying a reverse bias across said first, second and third layers to produce a depletion region which alters the optical coupling between said waveguides.

2. A semiconductive double heterostructure optical waveguide coupler according to claim 1 wherein said first layer is n-type GaAs, said second layer is p-type GaAlAs and said third layer is n-type GaAlAs.

3. A semiconductive double heterostructure optical waveguide coupler according to claim 2 wherein said second layer is approximately 0.3 $\mu$m thick.

4. A semiconductive double heterostructure optical waveguide coupler according to claim 2 wherein said plurality of waveguides comprises two waveguides extending alongside each other to form a directional coupler.

5. A semiconductive double heterostructure optical waveguide coupler according to claim 4 wherein said means for applying includes an electrode system for applying a reverse bias to produce said depletion region between said two waveguides, thereby increasing the index of refraction.

6. A semiconductive double heterostructure optical waveguide coupler according to claim 5 wherein said optical waveguides are formed by proton bombardment.

7. A semiconductive double heterostructure optical waveguide coupler according to claim 6 wherein said optical waveguides are 4 $\mu$m wide and separated from each other by approximately 3 $\mu$m.

8. A semiconductive double heterostructure optical waveguide coupler according to claim 1 wherein said first layer is n-type GaAs, said second layer is n-type GaAlAs, and said third layer is p-type GaAlAs.

9. A semiconductive double hererostructure optical waveguide coupler according to claim 8 wherein said plurality comprises two waveguides extending alongside each other to form a directional coupler.

10. A semiconductive double heterostructure optical waveguide coupler according to claim 9 wherein said waveguides are formed by diffusing a p-type dopant through said first and second layers.

11. A semiconductive double heterostructure optical waveguide coupler according to claim 10 wherein said means for applying comprises an electrode system for applying a reverse bias to produce said depletion region between said two waveguides.

12. A semiconductive double heterostructure optical waveguide coupler according to claim 1 wherein said first layer is n-type GaAs, said second and third layer is n-type GaAlAs.

13. A semiconductive double heterostructure optical waveguide coupler according to claim 12 wherein said plurality comprises two waveguides extending alongside each other to form a directional coupler.

14. A semiconductive double heterostructure optical waveguide coupler according to claim 13 wherein said waveguides are formed by diffusing a p-type dopant through said second layer into said first layer.

15. A semiconductive double heterostructure optical waveguide coupler according to claim 14 wherein said means for applying comprises an electrode system producing a depletion region through at least one of said waveguides.

* * * * *